United States Patent [19]
Yang

[11] Patent Number: 5,521,471
[45] Date of Patent: May 28, 1996

[54] SERIES (OR COMPOUND) MOTOR AND CONTROL CIRCUIT FOR ADJUSTING EFFECTIVE EXCITING TURN RATIO OF SERIES FIELD WINDING ACCORDING TO ROTATIONAL SPEED OR LOAD CURRENT

[76] Inventor: Tai-Her Yang, 5-1 Taipin St. Si-Hu Town, Dzan-Hwa, Taiwan

[21] Appl. No.: 329,780

[22] Filed: Oct. 27, 1994

Related U.S. Application Data

[63] Continuation of Ser. No. 87,416, Jul. 8, 1993, abandoned.
[51] Int. Cl.$^6$ ....................................................... H02P 1/18
[52] U.S. Cl. .............................................. 318/251; 318/531
[58] Field of Search .................................... 318/254, 138, 318/439, 245, 521–537, 246–252

[56] References Cited

U.S. PATENT DOCUMENTS

| | | | |
|---|---|---|---|
| 1,244,510 | 10/1917 | Lamme | 318/245 |
| 3,599,064 | 10/1969 | Friedman. | |
| 3,604,994 | 10/1969 | Conlon | 318/252 |
| 3,668,490 | 6/1972 | Conlon | 318/245 |
| 3,678,357 | 7/1972 | Swanke et al. | 318/245 |
| 3,721,875 | 3/1973 | Feldner et al. | 318/245 |
| 3,924,169 | 12/1975 | Craft et al. | 318/245 X |
| 3,943,421 | 3/1976 | Shibata et al. . | |
| 4,227,128 | 10/1980 | Cockroft et al. | 318/462 X |
| 4,409,528 | 10/1983 | Podell | 318/729 X |
| 4,678,972 | 7/1987 | Lehnhoff et al. | 318/254 X |
| 4,730,149 | 3/1988 | Zeitrogel | 318/246 |
| 4,935,678 | 6/1990 | Hoost | 318/268 |

*Primary Examiner*—David S. Martin
*Attorney, Agent, or Firm*—Bacon & Thomas

[57] ABSTRACT

A switch device is mounted between the power supply and a multi-tap series field winding in a series or compound motor. The switch is responsive to changes in rotational speed or load current in order to change the effective excitation turn ratio of the series winding.

7 Claims, 1 Drawing Sheet

5,521,471

SERIES (OR COMPOUND) MOTOR AND CONTROL CIRCUIT FOR ADJUSTING EFFECTIVE EXCITING TURN RATIO OF SERIES FIELD WINDING ACCORDING TO ROTATIONAL SPEED OR LOAD CURRENT

This application is a Continuation of application Ser. No. 08/087,416, filed Jul. 8, 1993 now abandoned.

SUMMARY OF THE INVENTION

The present invention relates to a series or compound motor and a control circuit in which a switch is provided for adjusting the effective excitation turn ratio of a series field winding based on the rotational speed or load current of the motor, and in particular to a switch device mounted between the power supply and a multi-tap series field winding which switches between the taps to control the torque in response to changes in the rotational speed of the motor, or the load current, in order to change the effective excitation turn ratio of the series winding and thereby optimize operating characteristics of the series motor under various conditions.

DETAILED DESCRIPTION OF THE INVENTION

Figure 1:
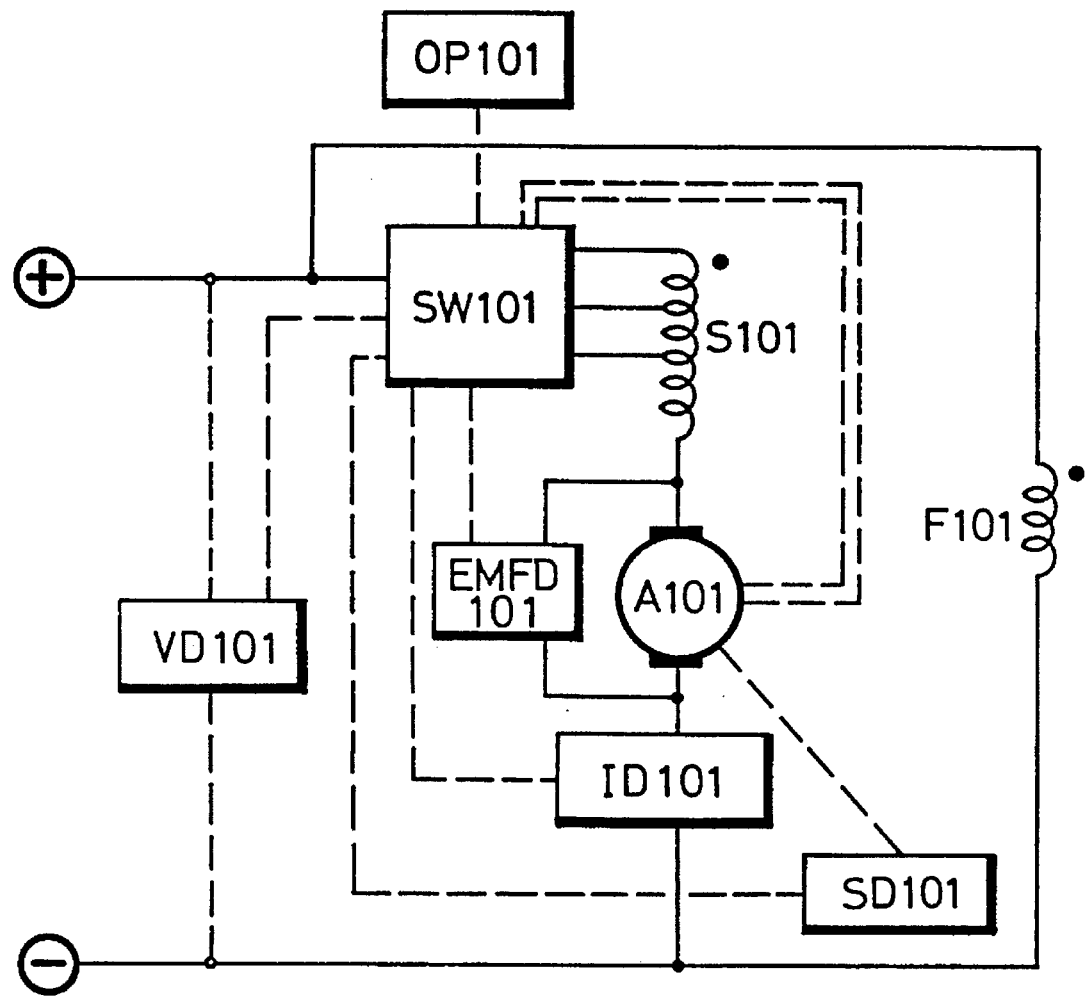
FIG. 1 is a diagram showing a closed-loop type primary circuit for a series or compound motor which adjusts the effective excitation turn ratio of the series field winding according to the rotational speed or load current.

In a conventional series or compound motor, the turn ratio of its series field winding is based on the motor's optimal rotational speed. At high speeds, the series field winding needs to have a lower turn ratio and at low speeds, the series field winding should have a higher turn ratio. As a result, when the speed range of the motor is relatively wide, the turn ratio is often less than optimal. The present design eliminates the turn ratio limitation by providing, in a series or compound motor, a control circuit for adjusting the effective excitation turn ratio of the series field winding according to the rotational speed, or load current, of the motor. For example, when the load current increases, the effective series winding is adjusted by the switch to provide the series or compound motor with a lower excitation turn ratio.

More specifically, the invention provides a switch device, mounted between the power supply and a multi-tap series field winding, which switches the taps to control the torque rotational speed, or load current, thereby changing the effective excitation turn ratio of the series winding and, consequently, the operating characteristics of the series motor under various conditions.

FIG. 1 is a diagram showing a preferred closed-loop type primary circuit for a series or compound motor and a circuit for adjusting the effective excitation turn ratio of the series field winding according to the rotational speed or load current, including at least one DC series motor having a multi-tap series field winding S101 and an armature A101. If the motor is a compound motor, a shunt winding F101 is also included.

The primary circuit includes at least ,one turn ratio varying switch device SW101 made up of analog or digital signal processing circuitry and electromechanical or solid-state switch elements, including a common pin leading to the power supply and three taps leading to the series field winding S101 for controlling the torque. The switch device SW101 is responsive to digital signal detector SD101, for detecting changes in motor rotational speed, to analog or digital detector ID101 for detecting motor load current, or to armature EMF detector EMFD101, each of which enables the turn ratio varying switch device SW101 to change the motor characteristics. When the load is lower and current smaller, the effective excitation turn ratio of the series field winding S101 becomes higher, but when the load is higher and current is rising, the turn ratio varying switch device SW101 will switch to a lower effective excitation turn ratio.

The circuit may further include a power supply voltage detector VD101 for measuring the voltage value of the power supply in order to correct the control command for the turn ratio varying switch device. For example, when a higher voltage is detected, the switch device can be set to increase the turn ratio of the effective excitation series field winding, thus taking into account a combination of the input and the motor load current or rotational speed value to form a combined feedback parameter for operating the switch device.

Finally, the circuit may include the operating input device OP101 which includes a manual or external signal interface for inputting relevant data to the turn ratio varying switch device.

The above-described circuit thus is a closed-loop type primary circuit which employs the motor speed, load current or EMF as a reference signal for controlling the turn ratio of a DC series or compound motor driven by a single voltage or variable voltage power supply, and further includes a load current detector, motor rotational speed detector, or armature EMF detector, for controlling the torque based on the known motor dynamic characteristics and with reference to commands from an operating input device for relative operation selection by the switch device.

For practical application, the present series or compound motor and circuit for adjusting the effective excitation turn ratio of the series field winding based on the rotational speed or load current may include an operating interface having the following functions and elements depending on the requirements of the application in which the motor is used:

(1) Manual switching to change the effective exciting winding turn ratio of the series field winding based on a desired speed.

(2) Torque selection obtained by changing the effective excitation winding turn ratio of the series field winding.

(3) A motor rotational speed detector SD101 for operating the switch device to change the effective excitation winding turn ratio of the series winding.

(4) A load current detector ID101 for operating the switch device to change the effective excitation winding turn ratio, of the series field winding.

(5) An armature EMF detector EMF101 for operating the switch device to change the effective excitation winding turn ratio of the series field winding.

(6) A power supply voltage detector for operating the switch device to change the effective excitation winding turn ratio of the series field winding.

(7) A combination of Item (1) and (2) for operating the switch device to change the effective turn ratio of the series field winding.

(8) A combination of Item (1) and (4) for operating the switch device to change the effective turn ratio of the series field winding.

(9) A combination of Item (1) and (5) for operating the switch device to change the effective turn ratio of the series field winding.

(10) A combination of Item (1), (3), (6) for operating the switch device to change the effective turn ratio of the series field winding.

(11) A combination of Item (1), (4), (6) for operating the switch device to change the effective turn ratio of the series field winding.

(12) A combination of Item (1), (5), (6) for operating the switch device to change the effective turn ratio of the series field winding.

(13) A combination of Item (1), (5), (6) for operating the switch device to change the effective turn ratio of the series field winding.

(14) A combination of Item (4) and (6) for operating the switch device to change the effective turn ratio of the series field winding.

(15) A combination of Item (5) and (6) for operating the switch device to change the effective turn ratio of the series field winding.

(16) A combination of Item (1), (3), (4) for operating the switch device to change the effective turn ratio of the series field winding.

(17) A combination of Item (1), (3), (5) for operating the switch device to change the effective turn ratio of the series field winding.

(18) A combination of Item (1), (4), (5) for operating the switch device to change the effective turn ratio of the series field winding.

(19) A combination of Item (3) and (4) for operating the switch device to change the effective turn ratio of the series field winding.

(20) A combination of Item (3) and (5) for operating the switch device to change the effective turn ratio of the series field winding.

(21) A combination of Item (4) and (5) for operating the switch device to change the effective turn ratio of the series field winding.

As those skilled in the art will appreciate, the various items described above can be selected as desired subject to such factors as horsepower and load in order to enhance the operation of the motor for different applications.

I claim:

1. A DC motor including a series field winding having a plurality of taps and means including a switch for connecting one of the taps with an input to the motor, said switch also being connected to means for measuring an operating state of the motor and supplying a signal to the switch in order to cause the switch to switch between said taps and thereby change the effective turn ratio in response to changes in said state.

2. A motor as claimed in claim 1, wherein said measuring means comprises means for measuring a load current.

3. A motor as claimed in claim 1, wherein said measuring means comprises means for measuring motor speed.

4. A motor as claimed in claim 1, wherein said measuring means comprises means for measuring electromotive force in the armature.

5. A motor as claimed in claim 1, further comprising means for measuring a voltage across inputs of the motor and supplying a signal representative of said voltage to said switch.

6. A motor as claimed in claim 1, wherein said motor is a shunt motor which further comprises a shunt winding.

7. A motor as claimed in claim 1, wherein said switch is arranged to increase the effective excitation turn ratio of the series field winding upon detection of a decrease in load current, and to switch to a lower effective excitation turn ratio when the load current rises.

* * * * *